United States Patent [19]
Dussia

[11] 3,765,448
[45] Oct. 16, 1973

[54] FLOW CONTROL VALVE
[75] Inventor: R. Jules Dussia, Chatham, N.J.
[73] Assignee: Chatham Precision, Inc., Chatham, N.J.
[22] Filed: Apr. 6, 1971
[21] Appl. No.: 131,658

[52] U.S. Cl................. 137/553, 74/89.15, 251/205, 251/267, 251/333, 251/334
[51] Int. Cl.......................... F16k 37/00, F16k 5/10
[58] Field of Search.................... 74/89.15; 251/267, 251/205, 333; 137/553

[56] References Cited
UNITED STATES PATENTS
2,564,066  8/1951  Jordan............................ 251/267 X Primary Examiner—Henry T. Klinksiek
Attorney—Popper, Bain, Bobis & Gilfillan

[57] ABSTRACT
Multiple embodiments of fluid flow control valves are disclosed to include a plurality of unique features including; an operating spindle mounted within the valve casing to provide protection for both the spindle and valve stem, means for indicating the position of the valve stem, e.g. a dial guage mounted directly on the stem or a two-stage scale mounted on the stem and on the valve operating spindle, a stem structure which accommodates flow path sizing as well as positive no-flow sealing without the use of soft seals, adjustment structure which eliminates tolerance problems resulting from manufacturing, and replaceable flow control apparatus to permit use of a single basic valve to provide flow control in a wide range of circumstances. Certain of the above-listed features are useful in embodiments of the valve suitable for ordinary known uses and others are particularly useful in precision metering valves of the type which are used to meter accurately small amounts of fluid across a high pressure drop or small amounts of fluid from atmosphere into a hard vacuum.

13 Claims, 14 Drawing Figures

PATENTED OCT 16 1973

INVENTOR
R. JULES DUSSIA
BY
POPPER, BAIN, BOBIS & GILFILLAN
ATTORNEYS

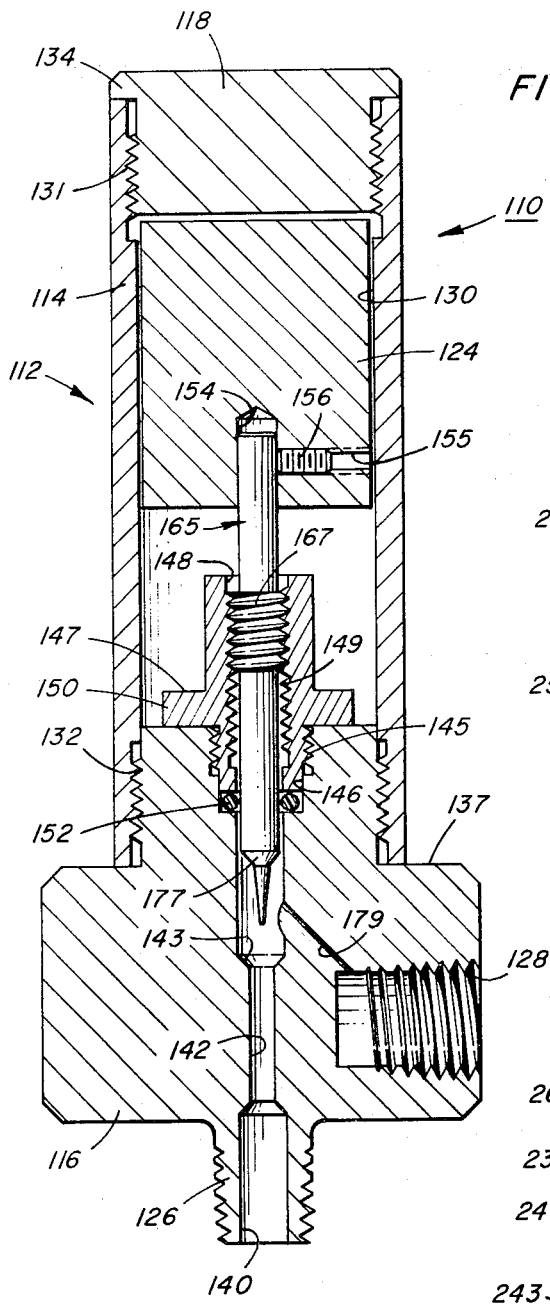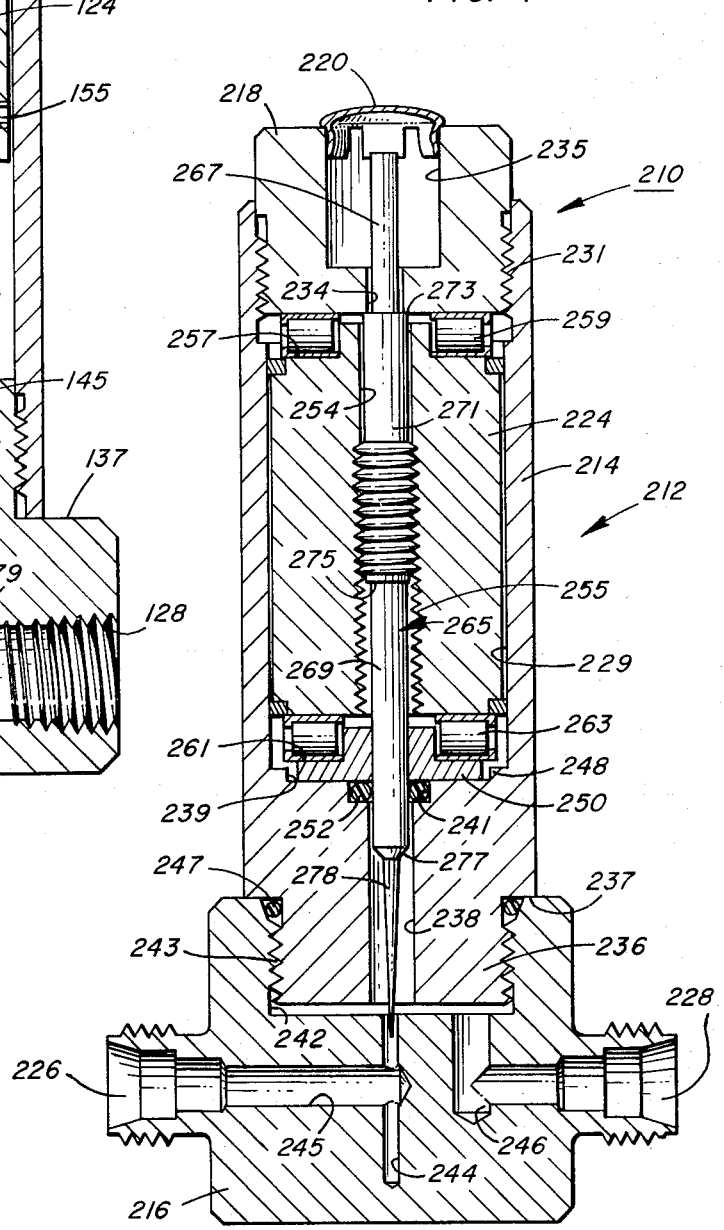

(a)
FIG. 7
(b)
(c)
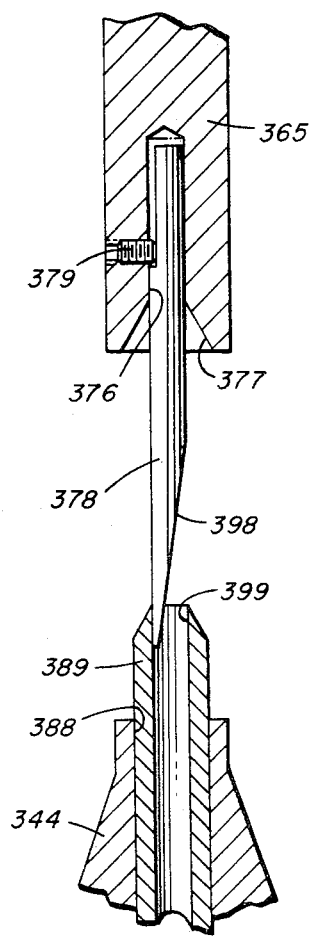
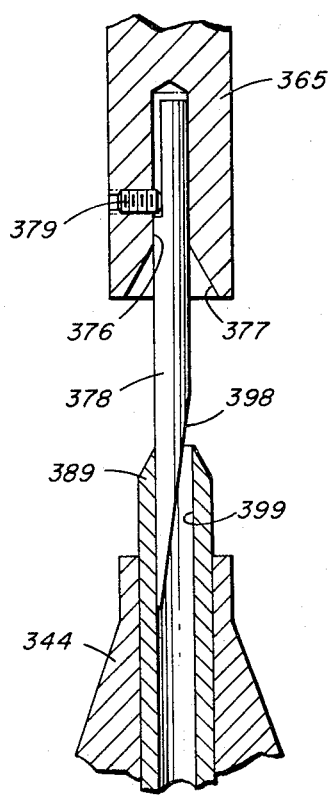
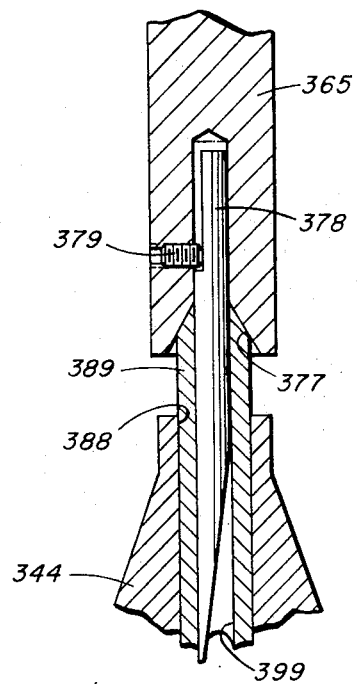

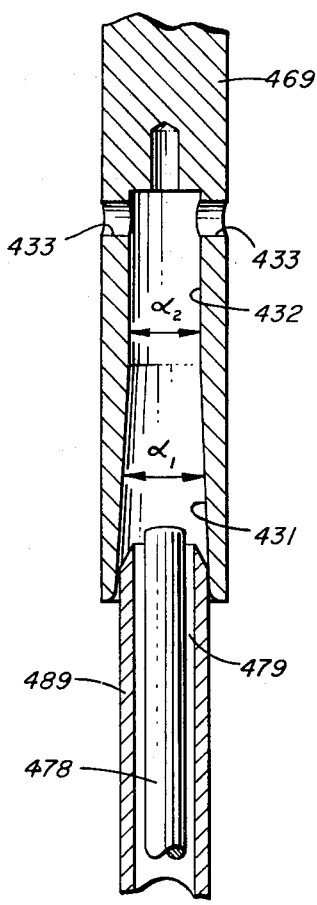
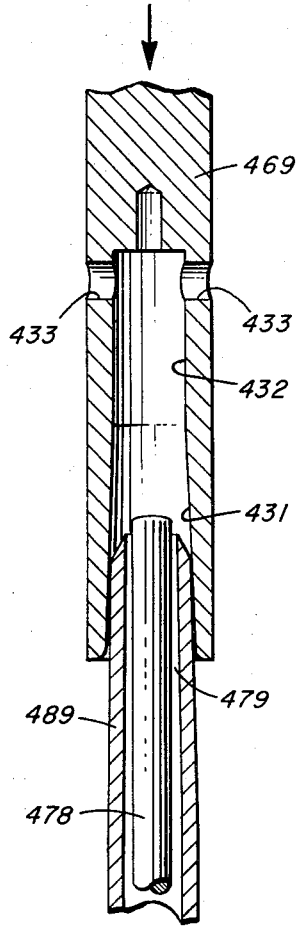
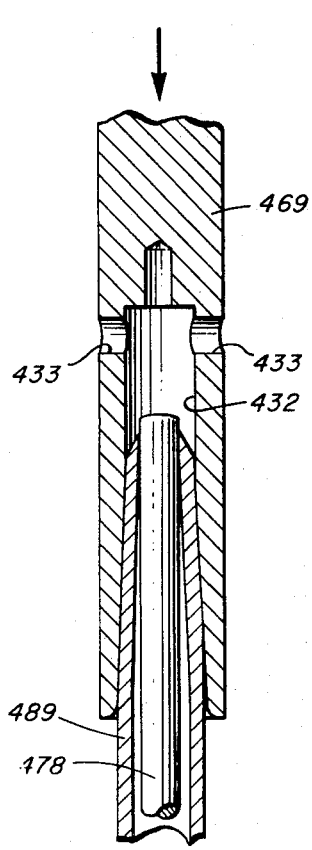
FIG. 9

FLOW CONTROL VALVE

BACKGROUND OF THE INVENTION

The present invention relates to the valve art generally and, in particular, certain embodiments of the present invention relate to precision metering valves of the type which are capable of metering minute amounts of fluid from a high pressure environment to a low pressure environment, e. g. from a high pressure into a hard vacuum.

One of the more serious problems encountered by those who are required to utilize valve devices has been the propensity of known valve devices to be damaged and rendered inaccurate or inoperable as a result of the valve being dropped or otherwise subjected to a shock loading. The damage experienced by the valves is most often to the valve operator, e. g. the handle or spindle, or to the valve stem, i. e., the member which operably connects the operator to the flow control structure such as a head and seat structure or a metering needle structure. If a valve is dropped and the handle is struck a jarring blow, the valve stem may be bent thus rendering the valve immediately inoperable, out of alignment or subject to wear which ultimately may cause valve failure. This problem of damage to the valve operating structure is particularly significant for highly sensitive valves such as precision metering valves. In such valves flow rate conditions often are predetermined and any damage to the operating mechanism may cause the valve to be carried out of calibration without the knowledge of the operator. Where flow rates and the precision metering of fluids are important to a process, test procedure or the like, and where a valve may be damaged without the knowledge of the operator, the effect of an improperly calibrated or operating valve may cause failure of the test and experiments, sometimes with attendant personal injury.

A further problem encountered by those in the valve art who deal with fine adjustment valves such as precision metering valves has been the difficulty experienced in positioning, properly, the flow controlling means associated with the valve for purposes of establishing a pre-selected flow rate in the circumstance of a known pressure differential. Such accurate positioning capability is required in many high precision metering valves, e. g., valves for controlling accurately the entrance of minute quantities of fluid into a hard vacuum where the quantity of fluid admitted to the vacuum may be desired to be so small as to approach molecular quantities. The problem is rendered more complex where the fluid is being admitted to the vacuum from an environment of much greater pressure, e. g., atmosphere or more.

With respect to these further problems, it has been proposed that a micrometer type gauge be utilized in precision metering valves as the valve operator. Thus, the rotating portion of the gauge is attached to the valve stem for rotation and displacement therewith and also to serve as the valve handle. As noted above, however, such an exposed valve handle gives rise to a high incidence of damage which is even more pronounced in the delicate mechanisms of such high precision valves. Further, the threaded connection between the stem and casing, and the fact that the casing serves as the base for the stem position indicator, introduces a thread-play error which is undesirable in highly accurate valves.

A still further problem which has been experienced with respect to high precision flow control valves relates to inaccuracies caused by the rotation of the flow control means during operation of the valve. More particularly, it is often the case that at least one element of a flow control means, e. g., a tapered needle, is mounted on an end of the valve stem for displacement into and out of flow permitting position. Because of the difficulties experienced in most precision machining methods, and because of the inherent eccentricity experienced in the tapered needles during manufacture and assembly, the rotation of the valve stem and therewith the tapered needle during operation of the valve generates a saw-tooth flow output curve. Those skilled in this art will recognize immediately that such a saw-tooth flow output curve is undesirable and that a smooth flow output curve always is to be sought.

Yet another problem with known flow control valves is the cumulative effect of one-side tolerances during manufacture. More specifically, in the manufacture of a member having plural parts, it is ordinary practice to assume that individual inaccuracies, each within tolerance, will be above or below the design dimensions to effect a new cancelling effect thus placing the over-all final dimensions within a desired tolerance. Although such an assumption is valid in most instances, there are certain situations wherein the inaccuracies all occur as to be totally cumulative thus causing the finished product to be out of tolerance. Where such cumulative inaccuracies occur, the valves must be discarded as being outside specification thus resulting in reduced yields and increased manufacturing costs.

A still further difficulty with known valves is that the "wetted" area of the valves, i. e., the area within the valves which is exposed to the fluid being controlled, has been of such great relative size that virtually all the components of known valves have been required to be manufactured of materials which are compatible with the chemistry and pressure requirements of the fluid being valved. Often this becomes very expensive and is thus something to be avoided.

SUMMARY OF THE INVENTION

It is an object of the present invention, therefore, to provide a valve with a protected operating means or spindle.

A further object of the present invention is to provide a valve wherein a stem position indicator can be mounted directly on the stem and also wherein a dial gauge can be utilized.

A further object of the present invention is to provide a precision valve wherein manufacturing tolerances can be accommodated for and precision dimensions can be established with a high rate of manufacturing yield and attendant low valve cost.

A still further object of the present invention is to provide a valve wherein certain of the valve elements may be replaced to provide a precision metering capability over a wide range of flow rate and pressure differential requirements.

The foregoing and other objects not enumerated are achieved by valves structured in accordance with the teachings of the present invention, one embodiment of which may include a casing means, a fluid flow path formed in the casing means including an inlet port, an outlet port, and passage means extending between the inlet and outlet ports, a flow control means for controlling the flow of fluid between the inlet port and the outlet port, and means for operating the flow control means, which operating means is contained within the casing and accessible to a valve operator through at least one aperture formed in the casing means.

Another embodiment of the present invention may include a casing means, a fluid flow path formed in the casing means including an inlet port, an outlet port, and passage means extending between the inlet and outlet ports, a longitudinally extending bore formed in the casing means which bore is in communication with the fluid flow path, a longitudinally extending stem disposed for longitudinally axial displacement within the bore, means for restraining the stem against the rotational movement within the bore, a flow control means for controlling the flow of fluid between the inlet port and the outlet port which is operable in response to the longitudinal displacement of the stem within the bore, means for imparting such longitudinal displacement to the stem, and means for indicating the longitudinal position of the stem.

BRIEF DESCRIPTION OF THE DRAWINGS

A more complete understanding of the present invention may be had from the following detailed description thereof, particularly when read in the light of the accompanying drawings, wherein:

FIG. 3 is a cross-sectional view similar to the view of FIG. 2 but showing a second embodiment of valve incorporating at least one of the features of the present invention;

FIG. 4 is a cross-sectional elevational view similar to the view of FIG. 2 but showing still another embodiment of valve according to the present invention;

FIGS. 7(a), (b) and (c) are partial cross-sectional elevational views showing the operation of the metering apparatus of the valve of FIGS. 5 and 6;

FIGS. 9(a), (b) and (c) are partial elevational cross-sectional views showing the operation of the metering apparatus with respect to the valve of FIG. 8.

DETAILED DESCRIPTION

Figure 1:
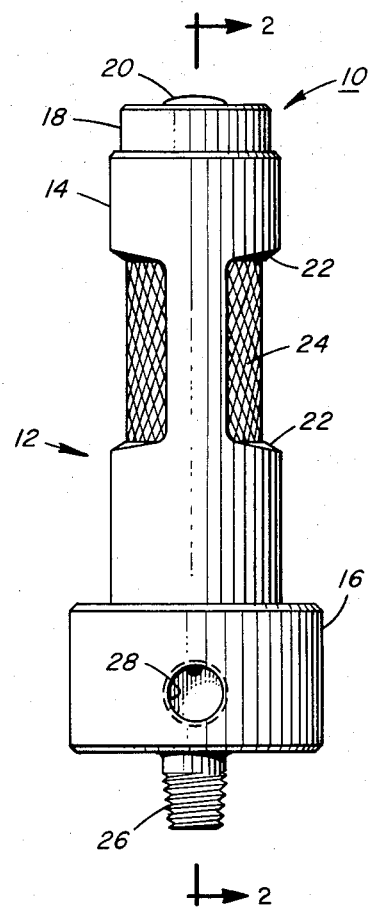
FIG. 1 is a front elevational view of a basic valve according to the invention.

Referring therefore to FIG. 1, one embodiment of a flow control valve according to the invention is designated generally by the reference numeral 10.

Valve 10 comprises a casing 12 including a cylinder portion 14 and a body portion 16. Cylinder portion 14 is closed at its upper end by a spindle retainer 18 having a plug cap 20 disposed thereon. Further, cylinder portion 14 is provided with a pair of apertures 22 which apertures provide finger access for a valve operator to grip valve operating spindle 24.

Body portion 16 of valve 10 is provided with a threaded male inlet fitting 26 and a threaded female outlet opening 28. As may be best seen in FIG. 2, body portion 16 is threadedly secured within the lower end of cylinder portion 14.

Figure 2:
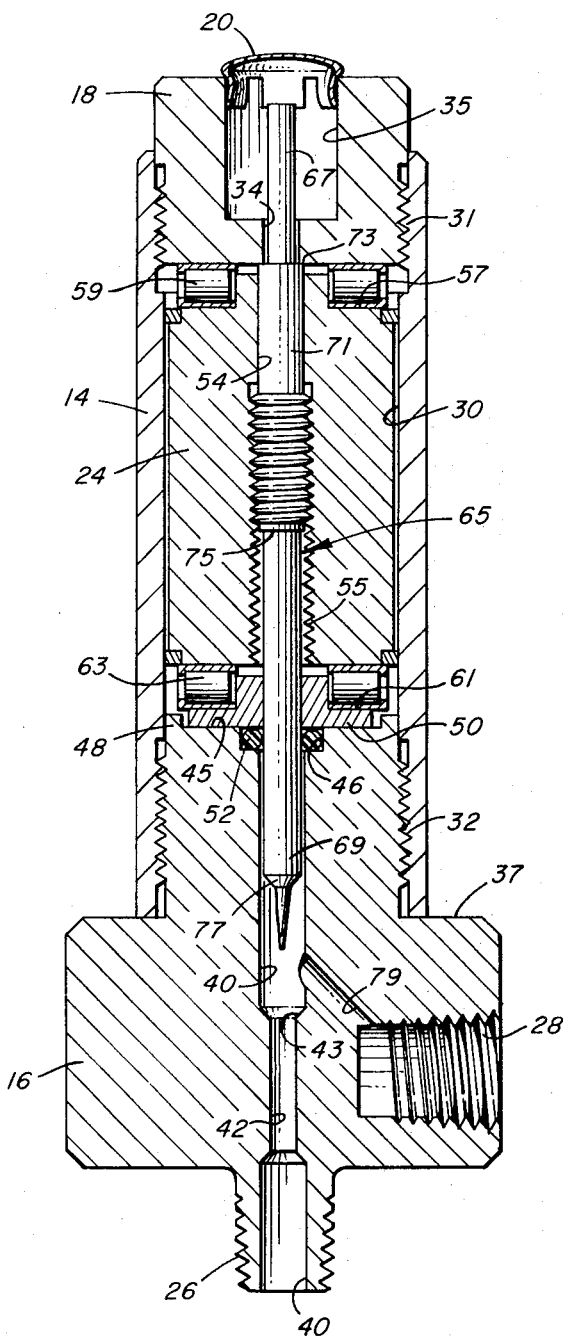
FIG. 2 is a cross-sectional view through the plane 2—2 of FIG. 1.

Referring therefore to FIG. 2 for the detailed construction of valve 10, it can be seen that the interior of cylinder portion 14 of casing 12 defines a longitudinally axially extending chamber in which are received body portion 16, spindle retainer 18 and spingle 24. More specifically, the inner surface 30 of cylinder portion 14 is provided with threads 31 adjacent its upper end opening and threads 32 adjacent its lower end opening.

Threadedly received within the upper end of cylinder portion 14 is spindle retainer 18 which comprises a generally cylindrical member having threads formed on its outer circumferential surface for rigidly engaging threads 31. Formed to extend longitudinally axially through spindle retainer 18 is a first bore 34 which communicates with a longitudinally coaxial counter-bore 35 which extends axially into spindle retainer 18 from the upper surface thereof. Frictionally received within counter-bore 35 by spring fingers formed thereon is a plug cap 20 which serves to close counter-bore 35 and prevent the introduction of dirt and other foreign matter into the valve 10. First bore 34 is provided with opposed chordal flats (not shown), the purpose of which is discussed below.

Body portion 16 of valve 10 includes two generally circular sections, namely a main lower section and a reduced diameter upper section. The circumferential surface of the upper section is provided with threads for rigidly engaging the lower threads 32 of cylinder portion 14. Thus, when body portion 16 is threaded fully into cylinder portion 14, the lower edge of cylinder portion 14 engages a radially extending shoulder 37 of body portion 16, which shoulder is formed at the juncture of the main lower section and the reduced diameter upper section of body portion 16.

Extending longitudinally axially through the entire length of body portion 16, from its upper surface to and through inlet fitting 26, is a bore 40. Bore 40 is provided with a reduced diameter portion 42 adjacent its lower end, which reduced diameter portion defines an annular shoulder 43, the purpose of which is discussed below in detail. Formed in the upper surface of body portion 16, and in coaxial communication with bore 40, are first and second longitudinally extending body counter-bores 45 and 46, respectively. First body counter-bore 45 is relatively large in diameter and defines a longitudinally extending annular shoulder 48 on the upper surface of body portion 16, which shoulder 48 defines a well for receiving and means for radially positioning a thrust washer 50 on the upper surface of body portion 16. Second body counter-bore 46 extends longitudinally axially downwardly from the radial surface of first body counter-bore 45, and defines an annular channel for receiving an O-ring seal 52.

Disposed within cylinder portion 14 and generally between spindle retainer 18 and body portion 16 is valve operating spindle 24. Spindle 24 is a generally cylindrical member which may have a knurled outer surface to facilitate a good grip by the fingers of a valve operator. Thhe upper and lower outer circumferential edges of spindle 24 are relieved to define channels for receiving rings 53 which act as dust seals and radial positioning means for the spindle. Extending longitudinally axially through the length of spindle 24 is a bore 54 which is provided with threads 55 throughout a major portion of its length from below the upper end fully to the lower end. The upper end of spindle 24 is provided with a reduced diameter portion which defines a radially extending annular channel 57 for receiving and positioning an upper roller bearing 59. Similarly, thrust washer 50 is provided with a relieved portion in its upper surface to define a radially extending annular channel 61 for receiving and positioning a lower roller bearing 63. The lower radial surface of spindle 24 is positioned on the upper race of lower roller bearing 63 and thus spindle 24 is mounted within cylinder portion 14 and operably between roller bearings 59 and 63 for substantially friction free rotation about the longitudinal axis of valve 10.

Bore 34 in spindle retainer 18, bore 54 in spindle 24 and bore 40 in body section 16 are coaxial and cooperate to define a main valve bore in which is received a valve stem 65.

Valve stem 65 comprises an upper section 67 which corresponds substantially in diameter to but is slidably received within first bore 34 of spindle retainer 18, a lower section 69 which is slidable within but correspondes substantially in diameter to the diameter of bore 40 in body portion 16, and a central section 71 which is slidable within but corresponds substantially in diameter to bore 54 of spindle 24. Upper section 67 of valve stem 65 is provided with chordally relieved portions corresponding to the chordal flats formed on first bore 34. Such chordally relieved portions of upper section 67 cooperate with the chordal flats of bore 34 to preclude rotation of valve stem 65 during operation of valve 10. The lower surface of central section 71 of stem 65 is threaded for cooperation with threads 55 of spindle bore 54 such that the rotation of spindle 24 causes an upward or downward displacement of stem 65 depending upon the direction of rotation of the spindle. The point of transition in the diameter of valve stem 65 from the diameter of central section 71 to the diameter of upper section 67 defines a radially extending annular shoulder 73 which cooperates with the lower surface of spindle retainer 18 to define a stop for limiting the upward movement of stem 65 within valve 10. Similarly, the point of transition in the diameter of valve stem 65 from the diameter of central section 71 to the diameter of lower section 69 defines a radially extending annular shoulder 75 which cooperates with the upper radial surface of thrust washer 50 to define a stop for limiting the downward movement of stem 65.

The lower end of stem 65 is tapered to define a generally conical head 77 for cooperating with annular shoulder 43 of bore 40 shoulder which defines a seat. Thus, when the surface of head 77 is in contact with the surface of annular shoulder 43, reduced diameter bore section 42 is closed to the upper portion of bore 40. In this regard, the portion of bore 40 above reduced diameter bore section 42 is in fluid communication with outlet opening 28 through a fluid passage 79 formed in body portion 16. Thus, the fluid flow path through valve 10 includes inward flow to the lower portion of bore 40, through reduced diameter bore section 42 and into the upper portion of bore 40, through fluid passage 79 and outwardly through outlet opening 28. Interruption of the flow of fluid through this path occurs when head 77 of stem 65 is displaced into surface-to-surface contact with the valve seat as defined by annular shoulder 43.

Considering now the manufacture of valve 10, it should suffice to say that each of the valve elements can be purchased on the open market or manufactured by machining methods which are generally known to machinists of ordinary skill. The materials to be used are all generally available, e. g. the spindle retainer and casing can be aluminum, the spindle can be mild steel and the body stem and thrust washer can be stainless steel. The roller bearings may be chrome steel such as those generally available and the O-ring may be one of any of those generally available, e. g., the VITON-A TYPE.

In assembling valve 10, body portion 16 with O-ring 52 prepositioned is threaded into the lower end of cylinder portion 14 until annular shoulder 37 engages the lower edge of cylinder 14. Thrust washer 50 and roller bearing 63 are then positioned within annular shoulder 48 in counter-bore 45, whereafter spindle 24 with stem 55 threadedly positioned therein is inserted within cylinder portion 14 such that the lower end of stem 65 extends into bore 40 and the lower surface of spindle 24 rests upon the upper race of roller bearing 63. Roller bearing 59 is then positioned in annular channel 57 of spindle 24, spindle retainer 18 is threadedly engaged to cylinder portion 14 of the casing 12 by threads 31, and counter-bore 35 of spindle retainer 18 is closed by plug cap 20.

So assembled, valve 10 is ready for use. Thus, inlet fitting 26 is connected to a suitable source of fluid, the flow of which is to be controlled. Similarly, outlet opening 28 is connected to a suitable discharge line (not shown) and fluid is introduced to the system. If it is desired to permit flow, spindle 24 is rotated by the fingers of an operator through apertures 22 such as to displace the head 77 of stem 65 away from seat 43. If, on the other hand, it is desired to stop the flow of fluid through the valve, spindle 24 is rotated in an opposite direction to displace stem 65 downwardly until head 77 engages seat 43 and a fluid tight seal is achieved. It should be noted that a certain amount of flow throttling is possible with head 77 structured as shown. As a practical matter, however, valve 10 is most properly designated as an on-off valve.

Three of the basic advantages of valves according to the teachings of the present invention are embodied in valve 10. Initially, it is clear that spindle 24 is wholly contained within the cylinder portion 14 of casing 12 and is thus protected from damage by dropping or similar acts. Secondly, it can also be seen from FIG. 2 that the fluid flow path of the valve is confined to bores and passages formed within the body portion 16, i.e., only passages in body portion 16 are "wetted" by the flowing fluid. As such, only the material of the body portion need be chosen with consideration being given to the possible corrosive characteristics of the fluid being controlled. The remaining materials of the valve can be chosen based upon considerations of economy and utility. Finally, the stem of valve 10 is non-rotating. Although this structural feature is not of great import for this particular embodiment, its advantages in conjunction with low flow, high precision metering valves as described in subsequent embodiments are of prime import.

A second embodiment of flow control valve incorporating features of valves according to the teachings of the present invention is shown in FIG. 3 and designated generally by the reference numeral 110. The external configuration of valve 110 is exactly the same as that of valve 10 as is shown in FIG. 1. The basic difference between the two valves is that the stem of valve 10 is non-rotating whereas that of valve 110 is directly secured to the operator spindle and thus rotates.

Considering therefore the detailed construction of valve 110 as is shown in FIG. 3, which figure is the same view as is shown in FIG. 2, valve 110 comprises a casing 112 which includes a cylinder portion 114 and a body portion 116. The cylinder portion 114 is closed at its upper end by a spindle retainer 118. Further, cylinder portion 114 is provided with a pair of apertures (not shown but similar to apertures 22 in valve 10 as shown in FIG. 1), which apertures provide for a valve operator to grip valve operating spindle 124 with his fingers. Body portion 116 of valve 110 is provided with a threaded inlet fitting 126 and an internally threaded outlet opening 128.

The interior of cylinder portion 114 of casing 112 defines a longitudinally axially extending chamber in which are received body portion 116, spindle retainer 118 and spindle 124. More specifically, the inner surface 130 of cylinder portion 114 is provided with threads 131 adjacent its upper end opening and threads 132 adjacent its lower end opening. Threadedly received within the upper end of cylinder portion 114 is spindle retainer 118 which comprises a generally circular member having threads formed on its outer circumferential surface for rigidly engaging threads 131. Formed around the upper edge of spindle retainer 118 is a generally radially outwardly extending flange 134 which engages the upper edge of cylinder portion 114 to limit the travel of spindle retainer 118 into the chamber defined by cylinder portion 114.

Body portion 116 of valve 110 includes two generally circular sections, a main lower section and a reduced diameter upper section. The circumferential surface of the upper section is provided with threads for rigidly engaging the lower threads 132 of cylinder portion 114. Thus, when body portion 116 is threaded fully into cylinder portion 114, the lower edge of cylinder portion 114 engages a radially extending shoulder 137 of body portion 116, which shoulder is formed at the juncture of the main lower section and the reduced diameter upper section of body portion 116.

Extending longitudinally axially through the length of body portion 116, from its upper end to and through inlet fitting 126 is a bore 140. Bore 140 is provided with a reduced diameter portion 142 adjacent its lower end, which reduced diameter portion defines an annular shoulder 143, the purpose of which is discussed below in detail.

Formed in the upper surface of body portion 116, and in coaxial communication with bore 140 are first and second longitudinally axially extending body counter-bores 145 and 146 respectively. First body counter-bore 145 is relatively large in diameter and is provided with internal threads to define a bore for threadedly rigidly receiving a stem support sleeve 147. Second body counter-bore 146 is smaller in diameter and cooperates with stem 165 to define an annular channel for receiving an O-ring seal 152.

Stem support sleeve 147 comprises a generally cylindrical member having a longitudinally axially extending bore 148 formed throughout its length. The surface of bore 148 is provided with threads 149 for threadedly receiving therethrough valve stem 165 as is discussed below in detail. Extending radially outwardly from the circumferential surface of sleeve 147 is a centrally disposed flange 150. The lower surface of flange 150 is adapted to engage the upper surface of body portion 116 to axially position stem support sleeve 147 with respect to body portion 116.

Disposed within cylinder portion 114 and generally between spindle retainer 118 and body portion 116 is valve operating spindle 124. Spindle 124 is an elongated bar having a circular cross section. Further, the circumferential surface of spindle 124 may be knurled to facilitate a good grip by the fingers of a valve operator.

Extending upwardly from the lower surface of spindle 124 is a bore 154 which is adapted to receive the upper end of valve stem 165. A radially extending tapped bore 155 extends from the outer surface of spindle 124 into bore 154. Tapped bore 155 is provided to receive a set screw 156 which is provided to secure valve stem 165 rigidly within spindle 124 so as to rotate therewith.

Bore 140 in body portion 116 and bore 148 in stem support sleeve 147 are co-axial and cooperate to define a main valve bore through which is operably received valve stem 165. Valve stem 165 is a longitudinally extending bar which is secured at its upper end within bore 154 in operating spindle 124 by set screw 156 as was noted above. The lower end of stem 165 is tapered to define a generally conical head 177 for cooperating with annular shoulder 143 of bore 140. In this regard, shoulder 143 defines a seat for cooperation with head 177 whereby, when the surface of head 177 is in contact with the surface of annular shoulder 143, reduced diameter bore section 142 is closed to the upper portion of bore 140.

The fluid flow path through valve 110 includes inward flow to the lower portion of bore 140 through inlet fitting 126, through the reduced diameter bore section 142 and into the upper portion of bore 140 whereafter the fluid passes through a passage 179 which communicates bore 140 with outlet opening 128. Interruption of the flow of fluid through this path occurs when head 177 of stem 165 is displaced into surface-to-surface contact with the valve seat as defined by annular shoulder 143. Such displacement of head 177 is effected by the rotation of operating spindle 124 which causes the rotation of stem 165 whereby threads 167, which are formed on the surface of stem 165 and which cooperate with threads 149 on bore 148 of stem support sleeve 147, cause the stem to be displaced upwardly or downwardly depending on the direction of rotation.

Considering now the manufacture of valve 110, each of the valve elements can be purchased on the open market or manufacutred by machining methods which are generally known to machinists of ordinary skill. As was noted above with respect to valve 10, the materials to be used are all generally available. In assembling valve 110, O-ring 152 is positioned within second counter-bore 146 and thereafter stem support sleeve 147 with stem 165 prepositioned therein is threadedly inserted within first counter-bore 145. Operating spindle 124 is positioned over the upper end of stem 165 and secured thereto by set screw 156. With the operating elements of the valve so positioned, cylinder portion 114 of casing 112 is threadedly engaged with the upper portion of body portion 116 and, finally, spindle retainer 118 is positioned within the upper end of cylinder portion 114.

With the valve thus assembled, it is ready for use. Being used, inlet fitting 126 is connected to a suitable source of fluid (not shown) the flow of which is to be controlled. Similarly, outlet opening 128 is connected to a suitable discharge line (not shown) and fluid is introduced to the system. In order to permit flow, spindle 124 is rotated by the fingers of an operator through apertures 122 such as to displace the head 177 of stem 165 away from seat 143. If it is desired to interrupt the flow of fluid through the valve, spindle 124 is rotated in an opposite direction to displace stem 165 downwardly until head 177 engages seat 143 and a fluid tight seal is achieved. As was the case with respect to valve 10, a certain amount of flow throttling is possible with head 177 structured conically as shown. As a practical matter, however, valve 110 is most properly designated as an on-off valve.

Valve 110 embodies two of the basic advantages of valves structured in accordance with the teachings of the present invention. Specifically, spindle 124 is wholly contained within cylinder portion 114 of casing 112 thus protecting it from damage by dropping or similar acts. Secondly, the fluid flow path of the valve is confined to bores and passages formed within the body portion 116. Thus, only surfaces within body portions 116 are "wetted" by the flowing fluid. Accordingly, only the material of the body portion and stem need be chosen with consideration being given to the possible corrosive characteristics of the fluid being handled.

A third embodiment of flow control valve incorporating features of valves according to the teachings of the present invention is shown in FIG. 4 and designated generally by the reference numeral 210. With the exception of the inlet and outlet fitting arrangement and the cross-section of the body portion, the external configuration of valve 210 is the same as that shown in FIG. 1 with respect to valve 10.

Considering now the detailed construction of valve 210 as shown in FIG. 4, which figure is the same view as the view shown in FIG. 2 with respect to valve 10, valve 210 comprises a casing 212 which includes a cylinder portion 214 and a body portion 216. The cylinder portion 214 is closed at its upper end by a spindle retainer 218. Further, cylinder portion 214 is provided with a pair of apertures (not shown but similar to apertures 22 in valve 10 as shown in FIG. 1), which apertures provide for a valve operator to grip valve operating spindle 224 wigh his fingers. Body portion 216 of valve 210 is provided with a threaded boss having an inlet opening 226 and a threaded boss having an outlet opening 228.

The major portion of the upper end of cylinder 214 is provided with a first bore 229 which defines a longitudinally axially extending chamber in which are received spindle retainer 218 and spindle 224. The inner surface of bore 229 is provided with threads 231 adjacent its upper end opening.

Threadedly received within the upper end of first bore 229 is spindle retainer 218 which comprises a generally cylindrical member having threads formed on its outer circumferential surface for rigidly engaging threads 231. Formed to extend longitudinally axially through spindle retainer 218 is a first bore 234 which communicates with a longitudinally co-axial counter-bore 235 which extends axially into spindle retainer 218 from the upper surface thereof. First bore 234 is provided with chordal flats (not shown), the purpose of which is discussed below. Frictionally received within counter-bore 235 by spring fingers formed thereon is a plug cap 220 which serves to close counter-bore 235 and to prevent the introduction of dirt and other foreign matter into the valve 210.

The lower end of cylinder portion 214 is relieved to define a reduced diameter section 236 which is provided with threads on the external surface thereof the purpose of which is discussed below in detail. The line of juncture of the main portion of cylinder portion 214 and the relieved portion 236 defines a radially extending shoulder 237 which cooperates with the upper surface of body portion 216 to axially position cylinder portion 214 with respect to body portion 216.

Extending through cylinder portion 214 from its bottom surface through and into communication with first bore 229 is a second bore 238. The base of first bore 229 adjacent its area of communication with bore 238 is provided with two co-axial counter-bores 239 and 241 respectively.

Body portion 216 of valve 210 is a generally rectangular member having a first bore 242 extending longitudinally axially from its upper surface, the surface of which bore is provided with threads 243. Extending further into body portion 216 is a longitudinally axially extending bore 244 which is relatively small in diameter as compared with bore 242. Bore 244 is in fluid communication with inlet opening 226 through a fluid passage 245 which extends transversely from inlet opening 226. Disposed radially outwardly of bore 244 and in communication with bore 242 is a longitudinally eccentric bore 246 which extends longitudinally downwardly from bore 242. Bore 246 is in fluid communication with outlet opening 228 through a fluid passage 247 which extends radially from bore 246 to outlet opening 228.

As is considered to be evident from FIG. 4, the threads on bore 242 are provided to cooperate with the threads on reduced diameter portion 236 of cylinder portion 214 of casing 212 to rigidly secure body portion 216 to cylinder portion 214. Further, it will be noted that the inter-engagement of body portion 216 and cylinder portion 214 cooperate to define an annular channel in which is mounted an O-ring 247 for precluding the passage of fluid from the internal portion of valve 210 along radially extending shoulder 237. Referring again to the bores and counter-bores in cylinder portion 214, first counter-bore 229 is relatively large in diameter and defines a longitudinally extending annular shoulder 248 in the base of bore 229, which shoulder 248 defines a well for receiving and means for radially positioning a thrust washer 250 in the base of bore 229. Counter-bore 241 extends longitudinally axially downwardly from the radial surface of counter-bore 239 and cooperates with stem 265 to define an annular channel for receiving an O-ring seal 252.

Disposed within cylinder portion 214 and generally between spindle retainer 218 and the base of bore 229 is valve operating spindle 224. Spindle 224 is a generally cylindrical member which may have a knurled outer surface to facilitate the finger grip of a valve operator. The upper and outer circumferential edges of spindle 224 are relieved to define channels for receiving rings 253 which act as dust seals and radial positioning means for the spindle. Extending longitudinally axially through the length of spindle 2224 is a bore 254 which is provided with threads 255 throughout a major portion of its length from below the upper end fully to the lower end thereof. The upper end of spindle 224 is provided with a reduced diameter portion which defines a radially extending annular channel 257 for receiving and positioning an upper roller bearing 259. Similarly, thrust washer 250 is provided with a relieved portion in its upper surface to define a radially extending annular channel 261 for receiving and positioning a lower roller bearing 263. The lower radial surface of spindle 224 is positioned on the upper race of lower roller bearing 263 and thus spindle 224 is mounted within cylinder portion 214 and operably between roller bearings 259 and 263 for substantially friction free rotation about the longitudinal axis of valve 210.

Bore 234 in spindle retainer 218, bore 254 in spindle 224, bore 238 in the base of cylinder portion 214 and bore 244 in body section 216 are co-axial and cooperate to define a main valve bore in which is received a valve stem 265. Valve stem 265 comprises an upper section 267 which corresponds substantially in diameter to but is slidably received within first bore 234 of spindle retainer 218, a lower section 269 which is slidable within but corresponds substantially in diameter to the diameter of bore 238 in the lower portion of cylinder portion 214, and a central section 271 which is slidable within but corresponds substantially in diameter to the diameter of bore 254 of spindle 224. Upper section 267 of valve stem 265 is provided with chordally relieved portions corresponding to the chordal flats formed on first bore 234. Such chordally relieved portions of upper section 267 cooperate with the chordal flats of bore 234 to preclude rotation of valve stem 265 during operation of valve 10. The lower surface of central section 271 of stem 265 is threaded for cooperation with threads 255 of spindle bore 254 such that the rotation of spindle 224 causes an upward or downward displacement of stem 265 depending upon the direction of rotation of the spindle. The point of transition of the diameter of valve stem 265 from the diameter of central section 271 to the diameter of upper section 267 defines a radially extending annular shoulder 273 which cooperates with the lower surface of spindle retainer 218 to define a stop for limiting the upward movement of stem 265 within valve 210. Similarly, the point of transition in the diameter of valve stem 265 from the diameter of central section 271 to the diameter of lower section 269 defines a radially extending annular shoulder 275 which cooperates with the upper radial surface of thrust washer 250 to define a stop for limiting the downward movement of stem 265 to preclude overdisplacement and damage to stem 265.

The lower end of stem 265 is provided with a two step taper to define a sharply tapered head 277 and a gradually tapered spear portion 278. Head 277 is adapted to cooperate with the upper edge of bore 244 in body portion 216 to define a head and seat for accomplishing full closure of valve 210. Spear portion 278 of stem 265 extends longitudinally axially within bore 244 to accomplish metering of the flow of fluid through the valve by restricting the cross-sectional area of bore 244 through which fluid is permitted to flow during the operation of the valve. When the surface of head 277 is in contact with the upper edge of bore 244, bore 244 is closed to the flow of fluid through valve 210 thus defining the full closed position of the valve. In this regard, the fluid flow path through valve 210 includes inwardly through inlet opening 226 and radially extending passage 245 to bore 244, upwardly into the volume defined by the cooperation of first bore 242 in body portion 216 and the lower portion of cylinder portion 214, downwardly through eccentric bore 246 and thereafter outwardly through radial passage 247 and outlet opening 228. Interruption of the flow of fluid through this path occurs when head 277 of stem 265 is displaced into surface-to-surface contact with the upper edge of bore 244 as noted above.

Considering now the manufacture of valve 210, and as noted above with respect to the earlier embodiment of valves described, each of the valve elements disclosed can be purchased on the open market or manufactured by machining methods which are generally known to machinists of ordinary skill. Further, the materials which may be used are generally available.

In assembling valve 210, O-ring 252 is positioned within annular channel 241 of cylinder portion 214, thereafter thrust washer 250 and lower bearing 263 are positioned within counter-bore 239. With stem 265 prepositioned therein, operating spindle 224 is positioned within bore 229 of cylinder portion 214 such that the lower portion of stem 265 extends downwardly through thrust washer 250 and into bore 238 in the base of cylinder portion 214 and such that the lower radial surface of operating spindle 224 comes to rest on the top race of roller bearing 263. With operating spindle 224 so positioned, upper roller bearing 259 is positioned on radial surface 257 of spindle 224 and thereafter spindle retainer 218 is threadedly engaged within the upper portion of the cylinder portion 214. Finally, plug cap 220 is frictionally fitted within counter-bore 235 of spindle retainer 218. With the spindle retainer assembly thus completed, cylinder portion 214 with O-ring 247 prepositioned thereon is threadedly engaged within bore 242 of body portion 216 until the lower edge of the main portion of the cylinder 214 engages radially extending shoulder 237. At this stage the valve is ready for operation.

In operation, inlet opening 226 may be connected to a suitable source of fluid (not shown) the flow of which is to be controlled. Similarly, outlet opening 228 may be connected to a suitable discharge line (not shown) and thereafter fluid may be introduced to the system. If it is desired to permit flow, spindle 224 is rotated by the fingers of an operator through apertures (not shown) in cylinder portion 214 such as to displace the head 277 of stem 265 away from the upper edge of bore 244 in body portion 216. If, on the other hand, it is desired to interrupt the flow of fluid through the valve, spindle 224 is rotated in an opposite direction to displace stem 265 downwardly until head 277 engages the upper edge of bore 244 and a fluid tight seal is achieved. As will be recognized by those skilled in this art, the further that stem 265 is displaced away from body portion 216, the further that conical spear 278 is withdrawn from bore 244 thereby permitting a gradual controlled increase in the flow of fluid through valve 210. Conversely, the further that stem 265 is displaced downwardly, the further that conical spear 278 is displaced into bore 244 and the greater the restriction of flow of fluid through valve 210.

Valve 210 offers two of the basic advantages of valves structured in accordance with the present invention. Specifically, spindle 224 is wholly contained within cylinder portion 214 of casing 212 and is thus protected from damage by dropping or similar acts. Secondly, stem 265 of valve 210 is a non-rotating stem which provides for the adaptation of this valve to use with a stem position indicator of the type discussed below with respect to subsequent embodiments.

Figure 6:
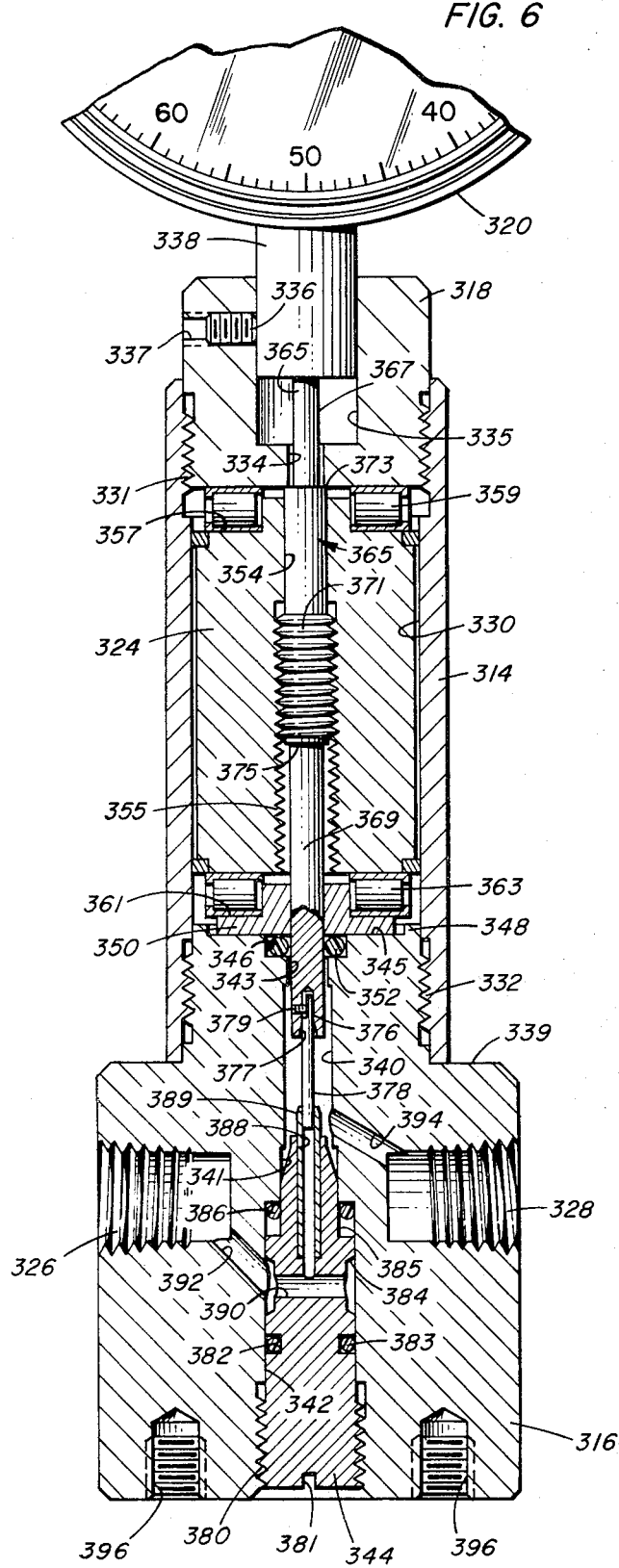
FIG. 6 is a cross-sectional elevational view through the plans 6—6 of FIG. 5.
Figure 5:
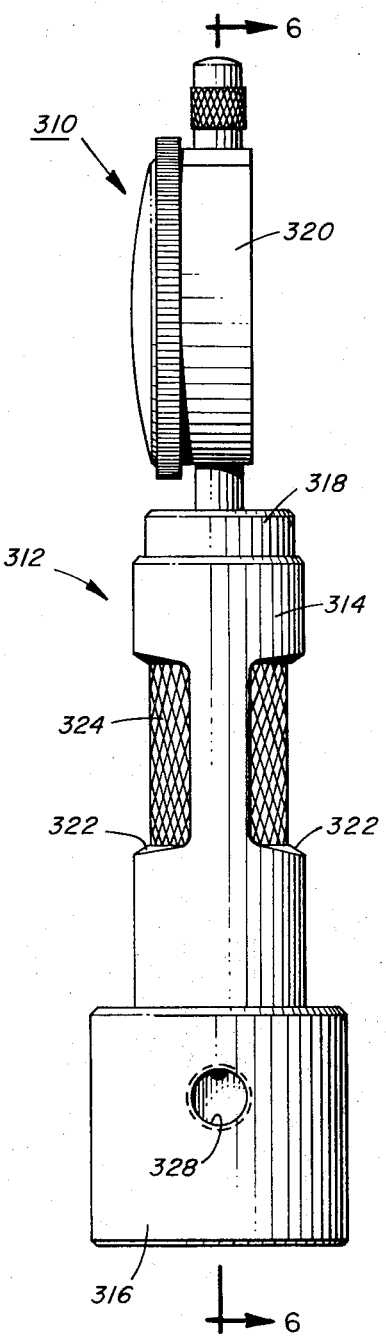
FIG. 5 is a side elevational view of yet another valve structured in accordance with the teachings of the present invention.

A fourth embodiment of flow control valve incorporating features of valves according to the teachings of the present invention is shown in FIGS. 5, 6 and 7 and designated generally by the reference numeral 310. Referring therefore to FIG. 5, valve 310 can be seen to comprise a casing 312 including a cylinder portion 314 and a body portion 316. Cylinder portion 314 is closed at its upper end by a spindle retainer 318 having a dial indicator 320 mounted thereon. Further, cylinder portion 314 is provided with a pair of apertures 322 which permit finger access for a valve operator to grip the valve operating spindle 324.

Body portion 316 of valve 310 is provided with a threaded inlet fitting 326 (FIG. 6) and a threaded outlet fitting 328. As may be best seen in FIG. 6, body portion 316 is threadedly secured within the lower end of cylinder portion 314.

Referring therefore to FIG. 6 for the detailed construction of valve 310, it can be seen that the interior of cylinder portion 314 of casing 312 defines a longitudinally axially extending chamber in which are received the upper end body portion 316, spindle retainer 318 and spindle 324. More specifically, the inner surface 330 of cylinder portion 314 is provided with threads 331 adjacent its upper end opening and threads 332 adjacent its lower end opening.

Threadedly received within the upper end of cylinder portion 314 is spindle retainer 318 which comprises a generally cylindrical member having threads formed on its outer circumferential surface for rigidly engaging threads 331. Formed to extend longitudinally axially through spindle retainer 318 is a first bore 334 which communicates with a longitudinally co-axial counter-bore 335 which extends axially into spindle retainer 318 from the upper surface thereof. Mounted within counter-bore 335 and securely retained by set screw 336 formed in tapped bore 337 is dial indicator 320. Dial indicator 320 may be any of those generally known in the art and is operably connected to valve stem 365 as a means for indicating the axial position of valve stem 365 within valve 310 as is discussed below in detail. The base 338 of dial indicator 320 corresponds substantially in diameter to the diameter of counter-bore 335 so as to assist in positioning the dial indicator and also to prevent the introduction of dirt and other foreign matter into the inner portions of valve 310.

Body portion 316 of valve 310 includes two generally circular sections, namely a main lower section and a reduced diameter upper section. The circumferential surface of the upper section is provided with threads for rigidly engaging the lower threads 332 of cylinder portion 314. Thus, when body portion 316 is threaded fully into cylinder portion 314, the lower edge of cylinder portion 314 engages a radially extending shoulder 339 of body portion 316, which shoulder is formed at the juncture of the main lower section and the reduced diameter upper section of body portion 316.

Extending longitudinally axially through the entire length of body portion 316, from its upper surface to and through its base is a bore 340. Bore 340 is provided with first and second counter-bores 341 and 342 adjacent its lower end. As will be discussed below in detail, the lower portion of second counter-bore 342 is threaded to operably receive a tube retainer 344. Provided adjacent the upper end of bore 340 is a reduced diameter portion 343. Formed in the upper surface of body portion 316 and in co-axial communication with reduced diameter portion 343 of bore 340 are third and fourth longitudinally extending body counter-bores 345 and 346 respectively. Third body counter-bore 345 is relatively large in diameter and defines a longitudinally extending annular shoulder 348 on the upper surface of body portion 316, which shoulder 348 defines a well for receiving and means for radially positioning a thrust washer 350 on the upper surface of body portion 316. Fourth body counterbore 346 extends longitudinally axially downwardly from the radial surface of third body counter-bore 345 and defines an annular channel for receiving an O-ring seal 352.

Disposed within cylinder portion 314 and generally between spindle retainer 318 and body portion 316 is valve operating spindle 324. Spindle 324 is a generally cylindrical member which may have a knurled outer surface to facilitate finger gripping by a valve operator. The upper and lower outer circumferential edges of spindle 324 are relieved to define channels for receiving rings 353 which act as dust seals and radial positioning means for the spindle. Extending longitudinally axially through the length of spindle 324 is a bore 354 which is provided with threads 355 throughout a major portion of its length from the upper end fully to the lower end. The upper end of spindle 324 is provided with a reduced diameter portion which defines a radially extending annular channel 357 for receiving and positioning an upper roller bearing 359. Similarly, thrust washer 350 is provided with a relieved portion in its upper surface to define an annular channel 361 for receiving and positioning a lower roller bearing 363. The lower radial surface of spindle 324 is positioned on the upper race of lower roller bearing 363 and thus spindle 324 is mounted within cylinder portion 314 and operably between roller bearings 359 and 363 for substantially friction-free rotation about the longitudinal axis of valve 310.

Bore 334 in spindle retainer 318, bore 354 in spindle 324 and bore 340 in body section 316 are co-axial and cooperate to define a main valve bore in which is received valve stem 365. Valve stem 365 comprises an upper section 367 which corresponds substantially in diameter to but is slidably received within first bore 334 of spindle retainer 318, a lower section 369 which is slidable within but corresponds substantially in diameter to the diameter of reduced diameter portion 343 of bore 340 in body portion 316, and a central section 371 which is slidable within but corresponds substantially in diameter to the diameter of bore 354 of spindle 324. Upper section 367 of valve stem 365 is provided with chordally relieved portions corresponding to the chordal flats formed on first bore 334. Such chordally relieved portion of upper section 367 cooperate with the chordal flats of bore 334 to preclude rotation of valve stem 365 during operation of valve 310. The lower surface of central section 371 of stem 365 is threaded for cooperation with threads 355 of spindle bore 354 such that the rotation of spindle 324 causes an upward or downward displacement of stem 365 depending upon the direction of rotation of the spindle. The point of transition of the diameter of valve stem 365 from the diameter of central section 371 to the diameter of upper section 367 defines a radially extending annular shoulder 373 which cooperates with the lower surface of spindle retainer 318 to define a stop for limiting the upward movement of stem 365 within valve 310. Similarly, the point of transition in the diameter of valve stem 365 from the diameter of central section 371 to the diameter of lower section 369 defines a radially extending annular shoulder 375 which cooperates with the upper radial surface of thrust washer 350 to define a stop for limiting the downward movement of stem 365.

The lower end of stem 365 is provided with a longitudinally axially extending bore 376 the lower portion of which is provided with a conical inwardly extending counter-bore 377. Bore 376 is adapted for removably receiving a tapered pin 378, the purpose of which is discussed below in detail. Pin 378 is operably secured within bore 376 by set screw 379.

Threadedly received within second counter-bore 342 of main body bore 340 is tube retainer 344. Tube retainer 344 comprises an elongated element of generally circular cross section having threads 380 formed on its lower circumferential surface, which threads are sized for cooperation with threads formed on the inner surface of counter-bore 342. Rotation of tube retainer 344 is accomplished by inserting and turning a suitable tool, e.g. a screw driver, in diametrically extending slot 381 formed in the lower transverse surface of tube retainer 344.

The circumferential surface of tube retainer 344 is relieved in a plurality of locations to provide annular channels for accomplishing various functions. Specifically, the surface of tube retainer 344 is relieved to define a first annular channel 382 in which is received an O-ring seal 383. Spaced upwardly from first annular channel 382 is a second relieved portion forming a second annular channel 384 which defines part of the fluid flow path of valve 310 as is discussed below in detail. Spaced upwardly from second relieved portion 384 is a third relieved portion 385 which cooperates with the inner surface of counter-bore 342 to define an annular space for receiving O-ring seal 386. The upper end of relieved portion 385 is tapered to accommodate the positioning of O-ring seal 386 during assembly of the valve. Extending axially longitudinally from the upper surface of tube retainer 344 is a bore 388 in which is received a metering tube 389. Bore 388 communicates with a transversely extending passage 390 which extends completely through tube retainer 344 to communicate one side of annular channel 384 with the other side of annular channel 384. The inside diameter of metering tube 389 is substantially equal to the basic diameter of metering pin 378 and cooperates with metering pin 378 to control the flow of fluid through valve 310 as is discussed below in detail.

Metering tube 389 is removably retained within bore 388 by being press fit within bore 388. Extending between inlet opening 326 and second counter-bore 342 of bore 340 is a fluid passage 392. Similarly, extending between outlet opening 328 and bore 340 is a fluid passage 394. These passages in body portion 316 cooperate with the fluid passages in tube retainer 344 to define the fluid flow path through valve 310. Specifically, the fluid flow path through valve 310 requires that fluid enter the valve through inlet opening 326 and through passage 392 into annular channel 384 of tube retainer 344. Thereafter, the fluid passes radially inwardly in transverse passage 390 and upwardly through the bore in metering tube 389. Assuming that the valve is in fluid flow permitting position, the fluid will then pass upwardly out of metering tube 389 into bore 340 and thereafter to outlet opening 328 through fluid passage 394.

Extending longitudinally upwardly from the bottom surface of body portion 316 are a plurality of tapped bores 396. Bores 396 are provided to permit base mounting of valve 310 on a suitable apparatus to be served in the manner generally known to those skilled in this art.

Considering now the manufacture of valve 310, and as noted above with respect to the earlier embodiments of valves described, each of the valve elements disclosed can be purchased on the open market or manufactured by machining methods which are generally known to machinists of ordinary skill. Further, the materials which may be used are generally available.

In assembling valve 310, body portion 316 with tube retainer 344 prepositioned is threaded into the lower portion of cylinder portion 314 of casing 312. With O-ring 352 in position within counter-bore 346, thrust washer 350 and lower roller bearing 363 are positioned within counter-bore 345. With stem 365 prepositioned therein, operating spindle 324 is positioned within bore 330 of cylinder portion 314 such that the lower portion of stem 365 extends downwardly through thrust washer 350 and into bore 340 in body portion 316 and also such that the lower radial surface of operating spindle 324 comes to rest on the top race of roller bearing 363. With operating spindle 324 so positioned, upper roller bearing 359 is positioned on radial surface 357 of spindle 324 and thereafter spindle retainer 318 is threadedly engaged within the upper portion of cylinder portion 314. Dial indicator 320 is then operably positioned within counter-bore 335 of spindle retainer 318 and secured by set screw 336.

It should be noted that both metering pin 378 and metering tube 389 are removably secured within stem 365 and tube retainer 344, respectively. This construction is provided in order to permit valve 310 to be utilized for a plurality of desirable flow ranges. Thus, matched metering pins and tubes can be provided for varying the flow control capabilities of valve 310 over a wide range of desired flow rates.

Additionally, it will be recognized by those skilled in this art that even the most precision machining processes are done to tolerances. It is ordinarily assumed that discrepancies with respect to design dimension, but within tolerance on each particular element, will be above or below the specified dimension such as to effect a cancellation of tolerance error in the overall manufacture of precision parts. It sometimes occurs, however, that tolerances will all be on one side of design dimensions, i.e. all tolerances of design dimensions will be exceeded by small amounts within the tolerance ranges for the individual components, but when the components are assembled the tolerances are additive thus causing the valve to be outside acceptable dimensions.

This assembly and machining problem does not occur with respect to valve 310 because of the axial adjustability of tube retainer 344. More specifically, with all of the elements of valve 310 assembled, tube retainer 344 can be axially positioned within body portion 316 by rotating the tube retainer within second counter-bore 342. This rotation causes the tube retainer and therewith metering tube 389 to be displaced axially upwardly or downwardly as desired to cause the operating elements of the valve to mate in perfect positioning.

With all of the components of valve 310 assembled, the valve is ready for operation. In operation, inlet opening 326 may be connected to a suitable source of fluid (not shown), the flow of which is to be controlled. Similarly, outlet opening 328 may be connected to a suitable discharge line (not shown) and thereafter fluid may be introduced to the system. If it is desired to permit flow, spindle 324 is rotated by the fingers of an operator through apertures 322 in cylinder portion 314 such as to displace stem 365 and therewith metering pin 378 upwardly within metering tube 389. If, on the other hand, it is desired to interrupt the flow of fluid through the valve, spindle 324 is rotated in an opposite direction to displace stem 365 downwardly until metering pin 378 extends fully within metering tube 389 and the conical surface 377 of the counter-bore in the base of stem 365 engages the upper surface of metering tube 389 to cause a surface-to-surface positive shut off of fluid flow.

A more complete understanding of the metering capability of and the operation of metering pin 378 and metering tube 389 may be had with reference to FIG. 7 which consists of three views, FIGS. 7(a), (b) and (c), corresponding to the fully open, partially open, and fully closed positions of metering valve 310.

Considering initially FIG. 7(a), metering pin 378 is shown secured within bore 376 of stem 365 by set screw 379. Similarly, metering tube 389 having longitudinally extending bore 399 therethrough is shown mounted within bore 388 of tube retainer 344. As is shown, the metering pin 378 is provided with a tapered flat surface 398 the function of which is to vary the cross-sectional area of the opening in the end of metering tube 389 to control the flow of fluid through bore 399 as is discussed below.

In FIG. 7(b), stem 365 has been displaced downwardly causing the lower end of metering pin 378 to extend further into bore 399 of metering tube 389. As is evident from the drawings, the tapered flat 398 of metering pin 378 has caused the cross-sectional area of the end opening of metering tube 389 to be substantially reduced thereby creating a flow restriction for fluid flowing through bore 399 of metering tube 389. In this manner, the flow of fluid through valve 310 is reduced.

Continued advancement of stem 365 downwardly and therewith metering pin 378 into bore 399 causes the untapered portions of metering pin 378 to be received within bore 399 thereby substantially filling the bore entirely with pin. Such closure of bore 399 for most purposes is satisfactory to stop floW through bore 399. However, a feature of the present invention provides for tapered conical surface 377 in the end of stem 365 upon the continued downward displacement of stem 365, to engage the upper tapered surface of metering tube 389 to displace metering tube 389 against the circumferential surface of metering pin 378 causing a positive surface-to-surface engagement and therewith a positive cutoff of flow through valve 310. It is considered to be worthy of note that this surface-to-surface engagement and displacement of the material of metering tube 389 against the outer surface of metering pin 378 has a secondary advantage during assembly of valve 310. More specifically, it has often been found that the tubes may be slightly out of round thereby causing difficulty in achieving desired flow control characteristics and causing the valve tO be somewhat inaccurate. The present valve overcomes this problem, however, by providing that upon assembly, stem 365 is advanced downwardly against metering tube 389, or in the alternative, tube retainer 344 iS displaced upwardly against stem 365 with the stem positioned in its lowermost position, i. e., with shoulder 375 in surface-to-surface engagement with the upper surface of thrust washer 350 (FIG. 6), until the upper tapered edge Of tube 389 engages conical surface 377 thereby causing it to be swaged or displaced against and to conform in configuration to the circumferential surface of metering pin 378 thereby providing a mated fit.

Valve 310 offers many of the basic advantages of valves structured in accordance with the present invention. Specifically, spindle 324 is wholly contained within cylinder portion 314 of casing 312 and is thus protected from damage by dropping or similar acts. Secondly, stem 365 of valve 310 is a non-rotating stem. This feature is significant because, as was noted above, thin wall tubes such as metering tube 389 are extremely difficult to manufacture with extreme accuracy. Thus, were metering pin 378 to be a rotating metering element, eccentricities in the metering pin and/or imperfections in the cross-section of the metering tube would cause saw-tooth fluid flow output characteristics rather than a smooth line fluid flow output characteristic as is achieved by the advancement and retraction of non-rotating metering pin 378 within metering tube 389 of the present invention. Thirdly, the non-rotating stem 365 permits direct operable connection between dial indicator 320 and stem 365 thereby permitting the use of a dial indicator with this type of valve without the necessity for adaptor fittings and the like. These basic advantages when considered in addition to the advantages noted above with respect to the axially adjustable tube retainer, the interchangeability of metering pins and tubes and the automatic swaging capability of the upper end of the metering tube with the conical surface formed in the lower end of the stem, clearly set valve 310 off as being an advance in the art of high precision flow metering valves.

Figure 8:
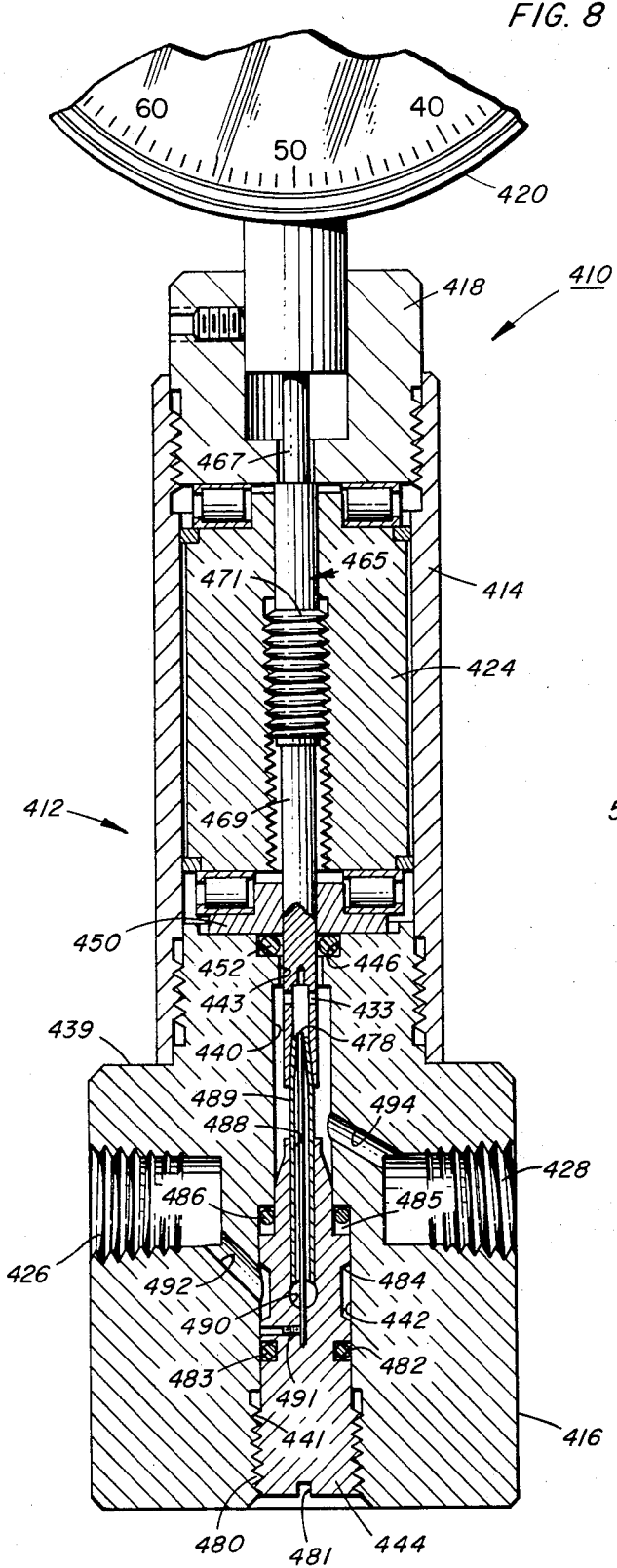
FIG. 8 is a cross-sectional elevational view similar to the view of FIG. 6 but showing yet another embodiment of valve according to the present invention.

A fifth embodiment of flow control valve incorporating features of valves according to the teachings of the present invention is shown in FIGS. 8 and 9 and designated generally by the reference numeral 410. Valve 410 with relatively minor exceptions as are discussed below in detail, is substantially identical in structure to valve 310 as discussed above. Specifically, valve 410 can be seen to comprise a casing 412 including a cylinder 414 and a body portion 416. Cylinder portion 414 is closed at its upper end by a spindle retainer 418 having a dial indicator 420 mounted thereon. Further, cylinder portion 414 is provided with a pair of apertures (not shown) which permit finger access for a valve operator to grip the valve operating spindle 424 in the manner discussed above with respect to valve 310.

Body portion 416 of valve 410 includes two generally circular sections, namely a main lower section and a reduced diameter upper section. The circumferential surface of the upper section is provided with threads for rigidly engaging the lower threads of cylinder portion 414 in the same manner as with respect to valve 310. Thus, when body portion 416 is threaded fully into cylinder portion 414, the lower edge of cylinder portion 414 engages radially extending shoulder 439 of body portion 416, which shoulder is formed at the juncture of the main lower section and the reduced diameter upper section of body portion 416.

Extending longitudinally axially through the entire length of body portion 416, from its upper surface to and through its base is a bore 440. Bore 440 iS provided with first and second counter-bores 441 and 442 adjacent its lower end. Further, the lower portion of first counter-bore 441 is threaded to operably receive a tube retainer 444. Adjacent the upper end of bore 440 there is formed a reduced diameter portion 443. Further, formed in the upper surface of body portion 416 and in coaxial communication with the reduced diameter portion 443 of bore 440 are third and fourth longitudinally extending body counter-bores 445 and 446, respectively. These counter-bores serve to position washers 450 and O-ring seal 452 in the same manner as discussed above with respect to the comparible parts in valve 310. of the Without considering for a moment the flow metering structure of valve 410, the fluid flow path of valve 410 is exactly that described above with respect to valve 310. Specifically, inlet opening 426 in body portion 416 is in communication with second counter-bore 442 through a fluid passage 492. Similarly, outlet opening 428 in body portion 416 is in communication with bore 440 through a fluid passage 494.

As is considered to be evident in the light of the foregoing, the structure of valve 410 is exactlY the same as that of valve 310 with the exception of the basic structure of the lower portion of valve stem 465 and the metering means mounted in tube retainer 444 which is threadedly received within first counter-bore 441 of main bore 440.

Considering therefore the basic structure of tube retainer 444, the tube retainer comprises an elongated element of generally circular cross-section having threads 480 formed on its lower circumferential surface, which threads are sized for cooperation with the threads formed on the inner surface of first counter-bore 441 of main bore 440. Rotation of the tube retainer 444 is accomplished by inserting and turning a suitable tool, e. g., a screw driver, in a diametrically extending slot 481 formed in the lower transverse surface of tube retainer 444. The circumferential surface of tube retainer 444 is relieved in a plurality of locations to provide annular channels for accomplishing various functions. Specifically, the surface of tube retainer 444 is relieved to define a first annular channel 482 for receiving an O-ring seal 483. Spaced upwardly from first annular channel 482 is a relieved portion which defines a second annular channel 484 which cooperates with counter-bore 442 to define part of the fluid flow path of valve 410. Spaced still upwardly from the second relieved portion is a third relieved portion 485 which co-operates with the inner surface of second counter-bore 442 to define an annular space for receiving O-ring seal 486. Extending longitudinally from the upper surface of tube retainer 444 is a bore 488 in which is received a metering assembly comprising metering tube 489 and a metering pin 478. Metering pin 478 and metering tube 489 cooperate to define an annular flow path for fluid flowing through valve 410 as is discussed below in detail. Additionally, metering pin 478 and metering tube 489 are removably retained within bore 488. Pin 478 is retained in position by a set screw 490 which is operably disposed in a radially extending tapped opening in tube retainer 444.

Longitudinally axially extending bore 488, in which is received metering tube 489, communicates with a transversely extending passage 490 in tube retainer 444 which permits fluid communication between annular channel 484 and the interior of metering tube 489 mounted in longitudinally extending bore 488.

Valve stem 465 of valve 410 is similar to the construction of valve stem 365 of valve 310 in that it comprises an upper portion 467, a lower section 469 and a central portion 471. Upper portion 467 and central portion 471 of valve stem 465 correspond exactly to upper portion 367 and central portion 371 of valve stem 365. Thus, the only difference between valve stem 465 and valve stem 365 is the structure of lower portion 469.

Considering therefore the structure of lower portion 469 of valve stem 465 it is considered initially to be evident that valve stem 469 is provided with an upwardly extending threaded section which is received within an axially extending tapped bore in central section 471 make the lower portion 469 removable from central portion 471. This feature provides for the adaptability of valve stem 465 for use with various metering tubes and metering pins to provide valve 410 with a wide range of operating capabilities.

As may be best seen in FIGS. 9(a), (b) and (c), the lower end of valve stem 465 is provided with a two-stage longitudinally axially extending tapered bore. The first stage defines a surface 431 which is tapered conically to define an acute angle $\alpha_1$, e. g., 20° included with respect to the longitudinal axis. The second stage defines a surface 432 which is tapered conically at a much more acute angle $\alpha_2$, e.g., 0°30' included with respect to the longitudinal axis of stem 465. Formed in the upper end of the two-stage bore in lower section 469 of the valve stem are a plurality of radially extending passages 433 which, as is discussed below in detail, define fluid passages for fluid to flow out of the stem bore. during operation of valve 410.

As noted generally above, metering tube 489 and metering pin 478 cooperate to define an annular flow pass 479 therebetween. In FIG. 9(a) the transverse cross-sectional area of annular flow path 479 is at maximum and this corresponds to the unrestricted flow condition for valve 410. If it is desired to restrict the flow of fluid through valve 410, operator spindle 424 is actuated to displace valve stem 465 downwardly, e. g. from the position shown in FIG. 9(a) to the position shown in FIG. 9(b). The downward displacement of stem 465 with surface 431 in engagement with metering tube 489 causes a displacement of the upper portion of metering tube 489 radially inwardly toward metering pin 478 thereby reducing the cross-sectional area of annular flow path 479 at the upper end thereof. In the operation of valve 410, this initial displacement of the upper end of metering tube 489 establishes an initial annular area of flow path 479 to define a reference point with respect to which metering of the flow of fluid to valve 410 is accomplished.

Further reduction on the flow of fluid through valve 410 is accomplished by advancing valve stem 465 still further downwardly which causes the external surface of metering tube 489 to be engaged by the tapered surface 432 causing still further displacement of the upper end of tube 489 toward metering pin 478. Advance of valve stem 465 is continued from the position shown in FIG. 9(b) to the position shown in FIG. 9(c) at which point the inner surface of metering tube 489 is caused to be in engagement with the outer surface of metering tube 478 thus effecting a full shutoff of valve 410.

The fluid flow rates with respect to which valve 410 is particularly useful are extremely low. In this regard, valve 410 has been structured with components wherein the internal diameter of metering tube 489 has been 0.031 inches and the external diameter has been 0.075 inches and the outside diameter of pin 478 has been 0.028 inches. During displacement of valve stem 465 from the position shown in FIG. 9(a) to the position shown in FIG. 9(b), the upper end of metering tube 489 is displaced radially inwardly by such an amount as to cause it to have an effective diameter of 0.029 inches. Because the full basic metering range of the valve occurs in the advancement of stem 465 from the position shown in FIG. 9(b) to the position shown in FIG. 9(c), metering occurs by an effective change in the inside diameter of metering tube 489 from 0.029 to 0.028 inches whereupon it is in surface-to-surface contact with the outside diameter of pin 478 thus effecting a firm shutoff of the valve.

As was noted above, radially extending passages 433 are provided in the lower portion 469 of valve stem 465 to provide for fluid flow during the operation of valve 410. Specifically, it can be seen from FIG. 9 that the engagement of the outer surface of metering tube 489 with conical surface 431 causes fluid flow from annular flow path 479 to be into the bores of the lower portion of valve stem 469. During operation of the valve, therefore, the fluid flow is thus out of annular channel 479 into the bores in stem portion 469 and thereafter radially outwardly through passages 433 to bore 440 and then to discharge opening 428 through passage 494.

Valve 410 embodies all of the basic features of valve structured in accordance with the present invention in the same manner as noted above with respect to valve 310. Further, valve 410 provides for a range of operation in flow rates which approach the passage of single molecules of flowing fluid per unit time.

Figure 10:
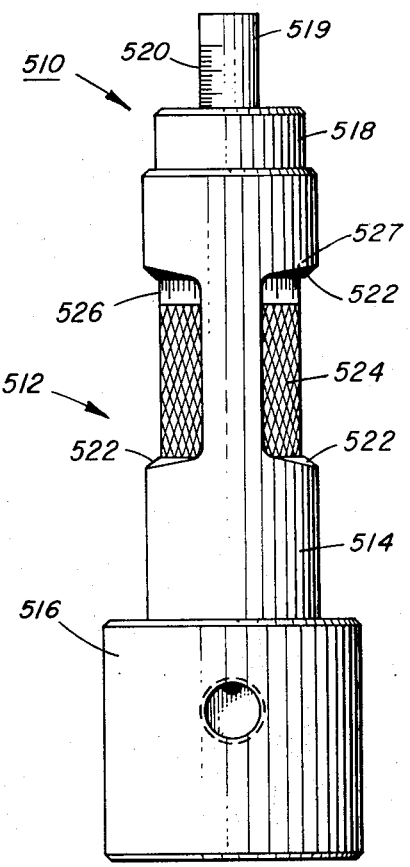
FIG. 10 is an elevational view of a basic valve according to the invention showing still another feature of valve according to the invention.

Valves in accordance with the teachings of the present invention may be provided with stem position indicators comprising a two-stage scale. Referring to FIG. 10, a valve which may be of the basic structure of either valve 310 or valve 410 is shown being provided with a two-stage scale stem position indicator rather than the dial indicator shown with respect to valves 310 and 410. Briefly, the valve of FIG. 10, designated generally by the reference numeral 510 comprises a casing 512 including a cylinder portion 514 and a body portion 516. Cylinder portion 514 is closed at its upper end by a spindle retainer 518 having a barrel 519 extending longitudinally axially therethrough. Barrel 519 is provided with a scale 520 on its surface and is secured to the upper end of the valve stem (not shown) of valve 510 for axial displacement therewith during operation.

Cylinder portion 514 is provided with a pair of apertures 522 which permit finger access for a valve operator to grip the valve operating spindle 524. The upper end of operator spindle 524 is provided with a graduated vernier scale 526 which is read with reference to an index scale 527 formed on the transverse surface of opening 522 adjacent scale 526.

In operation, barrel 519 is displaced upwardly and downwardly with the stem of valve 510. The graduations of scale 520 are such that each line may correspond to one rotation of operator spindle 524. Thus, scale 520 and scale 526 cooperate to define a two-stage scale including major graduations on scale 520 and a vernier type graduation on operator spindle 524.

It can be seen, therefore, that valve 510 provides the basic advantages of valves structured in accordance with this invention in conjunction with a two-stage scale stem position indicator.

The foregoing embodiments of valves according to the present invention incorporate one or more of the features of the present invention. Each can be modified without departing from the spirit and scope of this invention. For example where it is desired to have a more positive fluid seal between the "wetted" area of the valve and the "unwetted" area of the valve, a bellows type seal surrounding the lower end of the valve stem can be utilized as is generally known to those having skill in this art.

Further, the substitution of equivalent bearing means and fluid flow path arrangements can be accomplished in any of the many ways which are generally known to those skilled in these arts without departing from the spirit and scope of this invention.

Valves structured in accordance with the teachings of the invention, in addition to the advantages noted above, are capable of achieving flow rates as low as $5 \times 10^{-8}$ gallons per minute per unit pound per square inch pressure differential. Further, because of the direct operable connection between the stem position indicators and the stem, valve positions are accurate and not subject to thread play error.

Valves according to the present invention may be provided with plural inlet and outlet flow paths as noted above. Also, valves according to the invention may be manufactured so that the cylinder and body portions of the casing means are one-piece construction.

Finally, where a pneumatic or electric operator is desired to be used, the valve position indicator means can be provided for viewing through what is disclosed above to be the operating apertures.

It is to be recognized that although the foregoing detailed description has been written with respect to basic flow control and precision metering valves, the valves disclosed can be utilized as control valves and can be operated by electrical or pneumatic operating means in any of the manner generally known in the art.

I claim:
1. A flow control valve comprising:
   a casing having a longitudinally extending bore formed therein;
   a fluid flow path formed in said casing said fluid flow path including an inlet port, an outlet port and a passage extending between said inlet port and said outlet port, said longitudinally extending bore in said casing being in communication with said fluid flow path, and said passage being defined at least in part by an elongated tube disposed within said casing;

a longitudinally extending stem disposed for longitudinally axial displacement within said longitudinally extending bore;

at least one aperture formed in said casing;

means disposed within said casing for displacing said stem within said bore, said means for displacing said stem being accessible to an operator through said at least one aperture;

means engaging said stem for cooperating with said elongated tube to control the flow of fluid between said inlet port and said outlet port; and means for indicating the longitudinal position of said stem, said means for indicating comprising a dial gauge mounted on said casing means and operably connected to said stem.

2. A flow control valve according to claim 1 including means disposed on said longitudinally extending bore for engaging said stem to restrict said stem against rotation.

3. A flow control valve comprising:

a casing having a longitudinally extending bore formed therein;

a fluid flow path formed in said casing, said fluid flow path including an inlet port, an outlet port and a passage extending between said inlet port and said outlet port, said longitudinally extending bore in said casing being in communication with said fluid flow path;

a longitudinally extending stem disposed for longitudinally axial displacement within said bore;

flow control means for controlling the flow of fluid between said inlet port and said outlet port, said flow control means being operable in response to the longitudinal displacement of said stem within said bore;

means for restraining said stem against rotational movement within said bore;

means disposed within said casing for imparting longitudinal displacement to said stem; and means for indicating the longitudinal position of said stem, said means for indicating the longitudinal position of said stem comprising a dial gauge mounted on said casing means, said dial gauge being operably connected to said stem.

4. A flow control valve comprising:

a casing having a longitudinally extending bore formed therein;

a fluid flow path formed in said casing, said fluid flow path including an inlet port, an outlet port and a passage extending between said inlet port and said outlet port, at least a portion of said passage being defined by an elongated tube disposed within said bore, said longitudinally extending bore in said casing being in communication with said fluid flow path;

a longitudinally extending stem disposed for longitudinally axial displacement within said bore;

flow control means for controlling the flow of fluid between said inlet port and said outlet port, said flow control means including means disposed on said stem for varying the flow of fluid through said elongated tube, said flow control means being operable in response to the longitudinal displacement of said stem within said bore;

means for restraining said stem against rotational movement within said bore;

means disposed within said casing for imparting longitudinal displacement to said stem; and means for indicating the longitudinal position of said stem.

5. A flow control valve according to claim 4 including securing means mounted on said casing for selectively engaging and disengaging said tube, said securing means for engaging said elongated tube to secure said tube within said bore and for disengaging said elongated tube to permit removal of said tube from said bore.

6. A flow control valve according to claim 4 including: a retainer plug disposed within said longitudinally extending bore, said retainer plug defining means for mounting said elongated tube, and means disposed on the surface of said longitudinally extending bore for selectively engaging said retainer plug to position said retainer plug within said longitudinally extending bore.

7. A flow control valve according to claim 4 wherein said means disposed on said stem comprises a pin extending from the end of said stem, saidd pin being reciprocable into and out of said tube in response to the axial displacement of said stem.

8. A flow control valve according to claim 20 wherein said pin is slidably received within a bore formed in the end of said stem, and further including means for releasably securing said pin within said bore in said stem.

9. A flow control valve according to claim 4 and further including a pin disposed within said elongated tube, said pin cooperating with said tube to define a generally annular fluid flow path, and wherein said means disposed on said stem comprises a conical bore formed in the end of said stem, and wherein said conical bore is selectively engageable and disengageable with said tube in response to the axial displacement of said stem, said engagement of said conical bore for causing displacement of said tube toward and away from said pin to vary the size of said annular fluid flow path whereby to vary the rate of flow of fluid therethrough.

10. A flow control valve according to claim 9 wherein said pin is slidably received within said elongated tube, and further including means for releasably securing said pin in said elongated tube.

11. A flow control valve according to claim 4 and further including:

a conical bore formed in the end of said stem, said pin extending axially from the base of said conical bore, said conical bore for engaging said tube when said pin is fully inserted in said tube whereby to displace said tube against the circumferential surface of said pin.

12. A flow control valve comprising:

a casing including a cylinder portion and a body portion, said cylinder portion for defining a longitudinally axially extending chamber, said body portion being rigidly secured to said cylinder portion in one end of said chamber;

a spindle disposed within said chamber, said spindle being secured within said chamber by a spindle retainer which is threadedly secured to said cylinder portion within said chamber, said spindle being mounted for rotation within said chamber;

at least one aperture formed in said cylinder portion, said aperture for providing finger access to said spindle from outside said casing;

a longitudinally axially extending bore formed through said spindle, spindle retainer and body portion;

a fluid flow path formed in said body portion, said fluid flow path including an inlet port, an outlet port, and passage means extending between said inlet and outlet ports;

an elongated tube disposed within said longitudinally axially extending bore, said elongated tube comprising at least a portion of said passage;

a longitudinally axially extending stem disposed within said longitudinally axially extending bore for displacement therein;

means disposed on said stem for selectively interrupting the flow of fluid through said elongated tube, said means for selectively interrupting being operable in response to the rotation of said spindle within said chamber; and means for indicating the longitudinal position of said stem, said means for indicating the longitudinal position of said stem comprising a dial gauge mounted on said casing means and operably connected to said stem.

13. A flow control valve comprising:

a casing having a longitudinally extending bore formed therein;

a fluid flow path formed in said casing, said fluid flow path including an inlet port, an outlet port and a passage extending between said inlet port and said outlet port, said longitudinally extending bore in said casing being in communication with said fluid flow path;

an elongated tube disposed within said casing, said elongated tube defining at least a portion of said fluid flow path;

a longitudinally extending stem disposed for longitudinally axial displacement within said bore;

flow control means for controlling the flow of fluid through said elongated tube, said flow control means being operable in response to the longitudinal displacement of said stem within said bore;

means for imparting longitudinal displacement to said stem; and means for indicating the longitudinal position of said stem, said means for indicating the longitudinal position of said stem comprising a dial gauge mounted on said casing and engaging said stem.

* * * * *